W. H. EYNON.
UNIVERSAL PIPE FITTING.
APPLICATION FILED FEB. 1, 1909.

930,060.

Patented Aug. 3, 1909.

Witnesses:
F. C. Valentine
M. G. Rinehart.

Inventor:
Wm. H. Eynon
by Fred B. Dillman
his attorney.

UNITED STATES PATENT OFFICE.

WILLIAM H. EYNON, OF CLEVELAND, OHIO.

UNIVERSAL PIPE-FITTING.

No. 930,060.　　　　Specification of Letters Patent.　　　Patented Aug. 3, 1909.

Application filed February 1, 1909. Serial No. 475,378.

*To all whom it may concern:*

Be it known that I, WILLIAM H. EYNON, a citizen of the United States, residing at Cleveland, in the county of Cuyahoga and State of Ohio, have invented certain new and useful Improvements in Universal Pipe-Fittings, of which the following is a specification.

My invention relates to improvements in universal pipe fittings or couplings, the invention being designed to form a universal connection or coupling for two connected pipe members disposed in the same horizontal plane whereby said pipe members may be connected in any desired angle relative to each other.

The primary object of the invention is to provide a general improved fitting or coupling of this class which will be exceedingly simple in construction, cheap of manufacture, efficient in use, and much better adapted to its intended purposes than any other device of the same class with which I am acquainted.

With the above mentioned ends in view, the invention in its present embodiment, consists in the novel construction, arrangement and combination of parts hereinafter described, illustrated in the accompanying drawings, and particularly pointed out in the appended claim.

Figure 1:
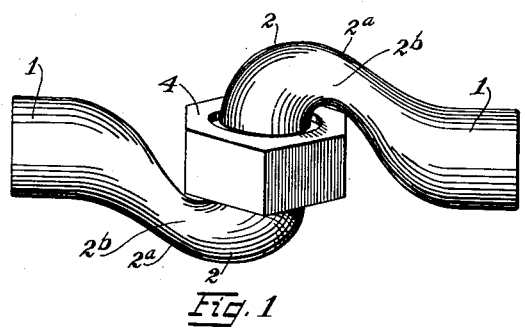
Figure 2:
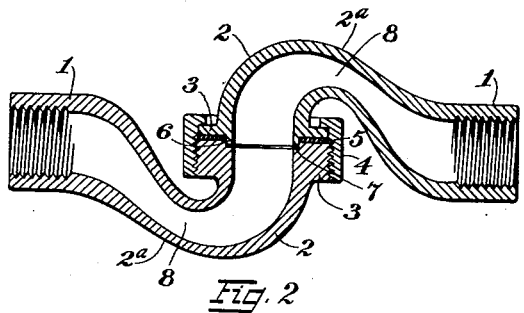
Figure 3:
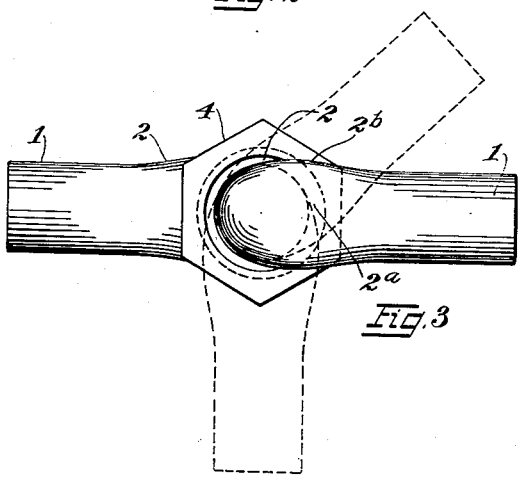

Referring to the drawings, forming a part of this specification, Figure 1, is a perspective view of a pipe fitting or coupling constructed in accordance with my invention. Fig. 2, a longitudinal sectional view of the same. Fig. 3, a top plan view of the same.

Similar numerals of reference designate like parts throughout all the figures of the drawings.

The coupling members of the improved universal pipe fitting are provided with main body portions 1, disposed in the same horizontal plane and provided with internal screw threads adapted to receive and contain the threaded ends of the pipe members to which it is attached. The coupling members each comprise off-set elbows 2, terminating in flanged heads 3, said flanged heads being disposed intermediate and extending at right angles to the plane of the main body portions 1. The flanged heads 3, are preferably connected by means of a union nut 4, carried upon one of the flanged heads and adapted to receive and take over the exteriorly threaded portion of the opposite flanged head in a well known manner. A rubber gasket 5, may be interposed between the face sides of the flanged heads 3, one of the flanged heads being preferably provided with an annular flange 6, adapted to take into or be seated in an annular off-set recess or pocket-groove 7, in the opposite flanged head.

By reason of the construction and relative disposition of the parts as described the coupling members are adapted to be disposed at any desired angle as indicated by the dotted lines in Fig. 3, of the drawings, and as a means for providing for a convenient construction or form for the coupling members and at the same time providing a bore or opening substantially corresponding in area to the bore or opening of the attached pipe members, each off-set elbow is provided with a reduced or flattened neck portion 2ª, having oppositely-disposed laterally-extending bilged portions 2ᵇ, thus providing a bore portion 8, of oval shape in cross section corresponding substantially to the area of the bore or openings in the pipe members in the main body portions 1.

From the foregoing description taken in connection with the accompanying drawings, the operation and advantages of my invention will be readily understood.

Having thus described an embodiment of my invention, what I claim and desire to secure by Letters Patent is,—

A universal pipe-fitting, comprising coupling members provided with off-set elbows having their connected heads intermediate and extending at right angles to the main body portions of said coupling members, said elbows being provided with reduced bilged neck portions having a bore corresponding in area to the bore of the pipe in said main body portions.

In testimony whereof I have affixed my signature, in presence of two witnesses.

WILLIAM H. EYNON.

Witnesses:
　O. O. BILLMAN,
　M. G. SWINEHART.